(12) United States Patent
Ritter et al.

(10) Patent No.: US 9,144,199 B2
(45) Date of Patent: Sep. 29, 2015

(54) ARTICULATED HARVESTING HEAD LOAD SENSOR ARRANGEMENT

(71) Applicant: DEERE & COMPANY, Moline, IL (US)

(72) Inventors: Aaron S. Ritter, Milan, IL (US); Benjamin M Lovett, Colona, IL (US); Bruce A Coers, Hillsdale, IL (US); Dennis P Silver, Geneseo, IL (US); Benjamin J Schlesser, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 61 days.

(21) Appl. No.: 14/014,672

(22) Filed: Aug. 30, 2013

(65) Prior Publication Data
US 2015/0059307 A1 Mar. 5, 2015

(51) Int. Cl.
*A01D 75/00* (2006.01)
*A01D 75/18* (2006.01)
*A01D 41/14* (2006.01)
*A01D 57/20* (2006.01)

(52) U.S. Cl.
CPC .............. *A01D 75/182* (2013.01); *A01D 41/14* (2013.01); *A01D 57/20* (2013.01)

(58) Field of Classification Search
CPC ....... A01D 41/00; A01D 41/12; A01D 41/14; A01D 41/144; A01D 57/02; A01D 61/002; A01D 67/00; A01D 75/182; A01D 57/20; A01F 12/18; G01G 3/00; G01G 3/14; G01G 19/12; G01G 23/3728; G01L 1/2225; G01L 5/00; G01L 5/0004
USPC ............ 56/10.2 E, 10.2 R, 6, 364, 16.2, 16.3, 56/228, 134, 159, 158, 181, 188, 208, 56/209; 73/862.629, 794, 774, 768; 177/136, 137
See application file for complete search history.

(56) References Cited

U.S. PATENT DOCUMENTS

| | | | | |
|---|---|---|---|---|
| 4,487,004 A * | 12/1984 | Kejr | | 56/14.4 |
| 4,576,053 A * | 3/1986 | Hatamura | | 73/862.629 |
| 5,965,849 A * | 10/1999 | Ikoma | | 177/136 |
| 6,041,582 A | 3/2000 | Tiede et al. | | |
| 6,769,315 B2 * | 8/2004 | Stevenson et al. | | 73/862.629 |
| 7,614,206 B2 * | 11/2009 | Tippery et al. | | 56/15.8 |
| 8,176,716 B2 * | 5/2012 | Coers et al. | | 56/364 |
| 2007/0204583 A1 * | 9/2007 | Coers | | 56/14.4 |
| 2008/0295473 A1 * | 12/2008 | Tippery et al. | | 56/14.5 |

FOREIGN PATENT DOCUMENTS

| EP | 1401256 A1 | 3/2004 |
| EP | 2628378 A2 | 8/2013 |

OTHER PUBLICATIONS

European Search Report issued in counterpart application No. 14177466.1, dated Jan. 26, 2015 (5 pages).

* cited by examiner

*Primary Examiner* — Robert Pezzuto

(57) ABSTRACT

An articulated harvesting head load sensor arrangement is provided that includes two harvesting head sections (102, 104, 106) that are coupled with a first pivot pin (162) that is a load pin.

13 Claims, 3 Drawing Sheets

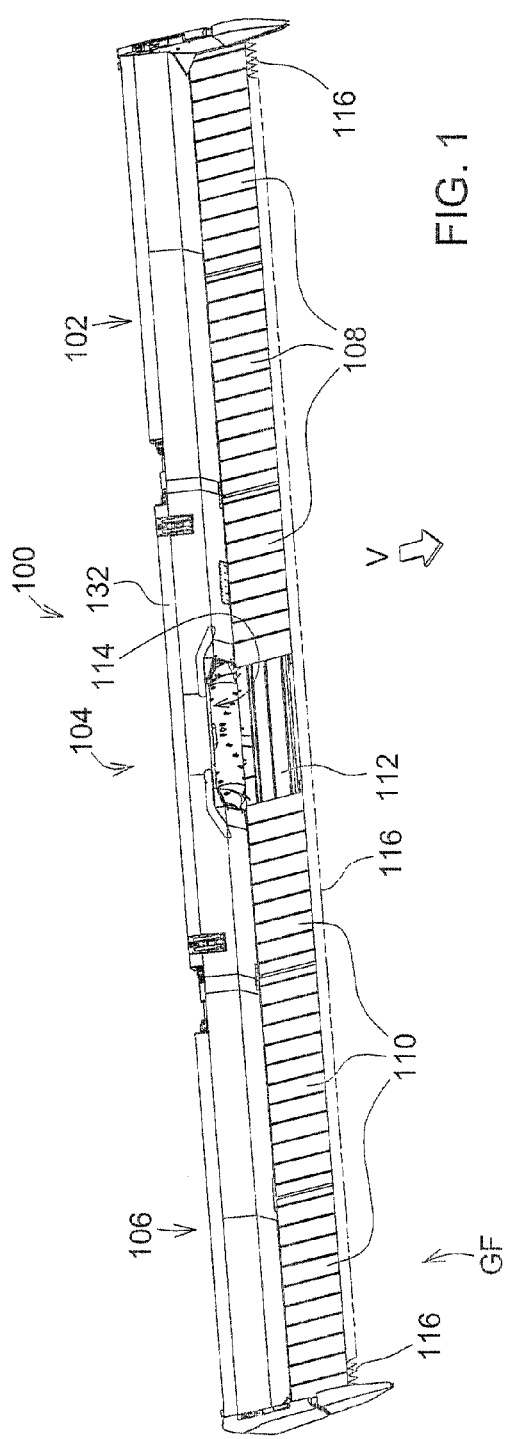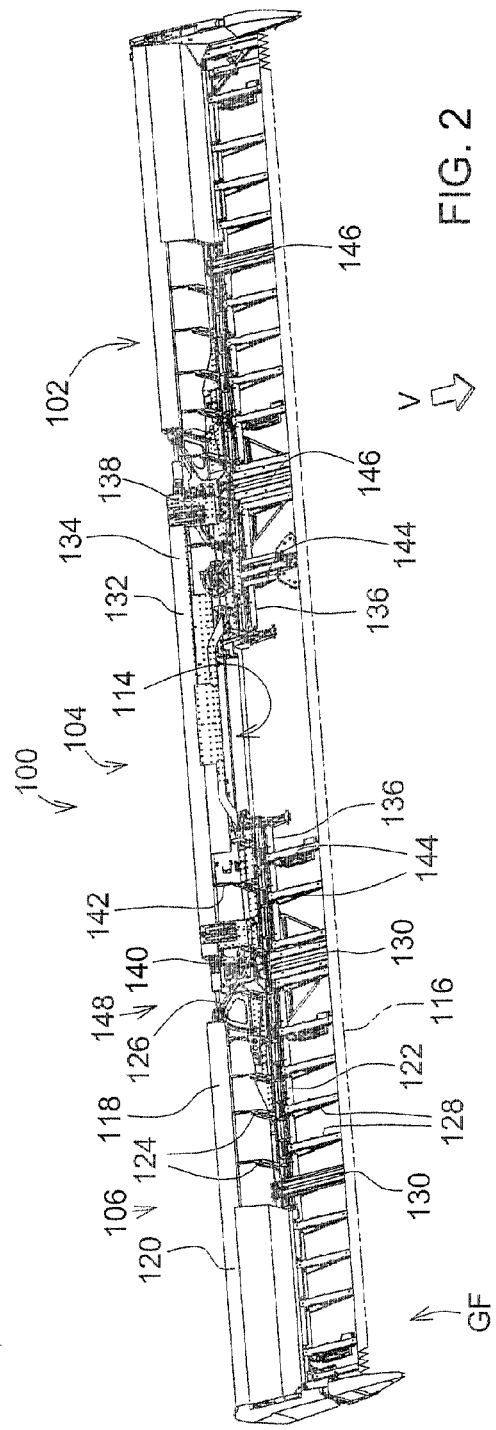

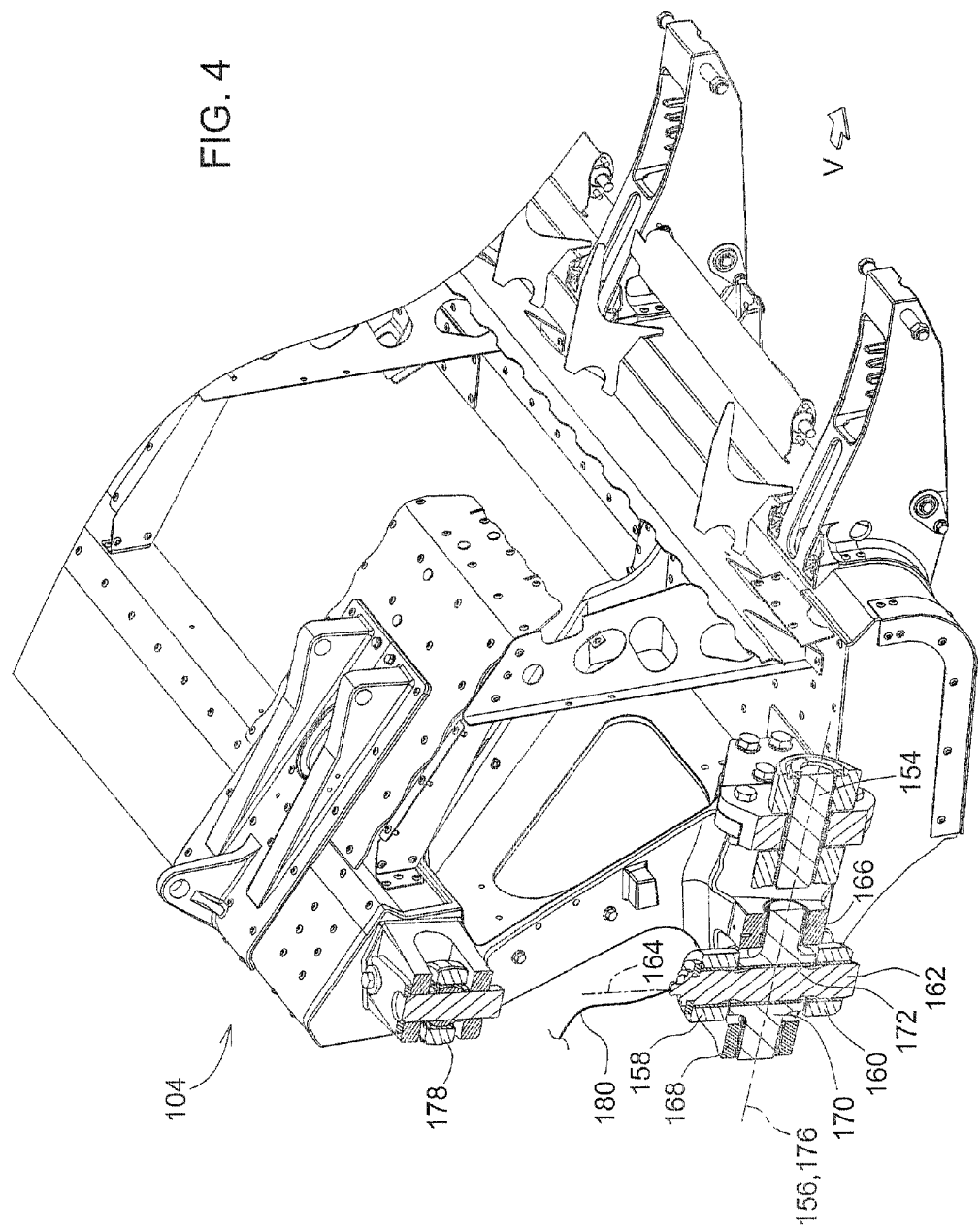

US 9,144,199 B2

ARTICULATED HARVESTING HEAD LOAD SENSOR ARRANGEMENT

FIELD OF THE INVENTION

This invention relates to agricultural harvesting equipment. More particularly, it relates to agricultural harvesting heads. Even more particularly, it relates to articulated agricultural harvesting head load sensor arrangements.

BACKGROUND OF THE INVENTION

Agricultural harvesting heads such as draper platforms are designed to follow closely along the ground harvesting crops. To ensure that they follow the ground closely, they are configured to contact the ground and apply a slight ground force to the ground. Hydraulic electric circuits are typically provided to ensure that only a small portion of their weight is actually pressed against the ground. As the ground rises and falls underneath the agricultural harvesting head, the position of the agricultural harvesting head is adjusted up and down with respect to the agricultural combine on which the agricultural harvesting head is supported. This permits the agricultural harvesting head to adjust to changing terrain.

In recent years, articulated agricultural harvesting heads have been designed. Articulated heads comprise two or more elongated sections that are hinged to each other. As the terrain changes, each section rises and falls with respect to the ground independently of the other sections.

One problem in articulated agricultural harvesting heads is maintaining a relatively constant and light force against the ground. In a three section articulated agricultural harvesting head, for example, the two end sections are hingeably connected to a center section. The center section is supported on the agricultural combine itself. The two outer hinged sections are supported on the ground, and also are supported on the center section itself. To maintain a constant ground force of the two outer hinged sections against the ground, some of their load must be transferred to the center section. Yet the center section must also be maintained at a relatively constant ground force against the ground. This transfer of loads between the sections and to the agricultural combine itself is difficult.

As the ground terrain changes, however, the two outer hinged sections can contact the ground with such force that the two outer hinged sections are pulled backwards sufficient to damage the agricultural harvesting head or the feederhouse of the combine harvester that supports the agricultural harvesting head and carries it through the field.

To prevent this from happening, it is important that certain automatic responses occur whenever the outer hinged sections of the agricultural harvesting head dig into the ground too deeply and generate too large a backward force.

What is needed, therefore, is an improved arrangement for monitoring the ground force applied to the outer sections of an articulated agricultural harvesting head to permit corrective action to be taken and to prevent damage to the articulated agricultural harvesting head It is an object of this invention to provide such an arrangement.

SUMMARY OF THE INVENTION

In accordance with one aspect of the invention, an articulated harvesting head load sensor arrangement is provided, comprising: a first harvesting head section; a second harvesting head section hingeably coupled to the first harvesting head section; and a first pivot pin hingeably coupling the first harvesting head section to the second harvesting head section; wherein the first pivot pin is a load pin configured to generate an electrical signal indicative of a load applied to the first pivot pin.

The first pivot pin may be cylindrical and may define a longitudinal axis.

The longitudinal axis of the first pivot pin may be disposed generally vertically.

The articulated harvesting head load sensor arrangement may further comprise a second pivot pin, and the second pivot pin may be disposed to hingeably couple the first harvesting head section to the second harvesting head section.

The first pivot pin may define two diametrically opposed trunnions of a cross trunnion.

The first pivot pin may be received inside a second pivot pin, and the second pivot pin may have a central aperture and two opposing ends that define two diametrically opposed trunnions of the cross trunnion.

A central axis of the second pivot pin may be disposed in the same plane as the central axis of the first pivot pin.

The first pivot pin may pivot together with the first harvesting head section with respect to the second harvesting head section.

In accordance with a second aspect of the invention, an articulated harvesting head load sensor arrangement may be provided, comprising: a first harvesting head section; a second harvesting head section; a third harvesting head section; a first pivot pin hingeably coupling the first harvesting head section to the second harvesting head section; and a second pivot pin hingeably coupling the third harvesting head section to the second harvesting head section; wherein the first pivot pin and the second pivot pin are load pins.

The first pivot pin may be configured to generate a first load signal indicative of a ground force applied to the first harvesting head section, and the second pivot pin may be configured to generate a second load signal indicative of a ground force applied to the third harvesting head section.

BRIEF DESCRIPTION OF THE DRAWINGS

FIG. 1 is a perspective front view of an agricultural harvesting head in accordance with the present invention FIG. 2 is a perspective front view of the agricultural harvesting head of FIG. 1 with the back sheets and conveyor belts removed.

FIG. 4 is a cross-sectional perspective view of the right side hinge joint of FIG. 3 taken at section line 4-4 in FIG. 3.

DETAILED DESCRIPTION

Figure 3:
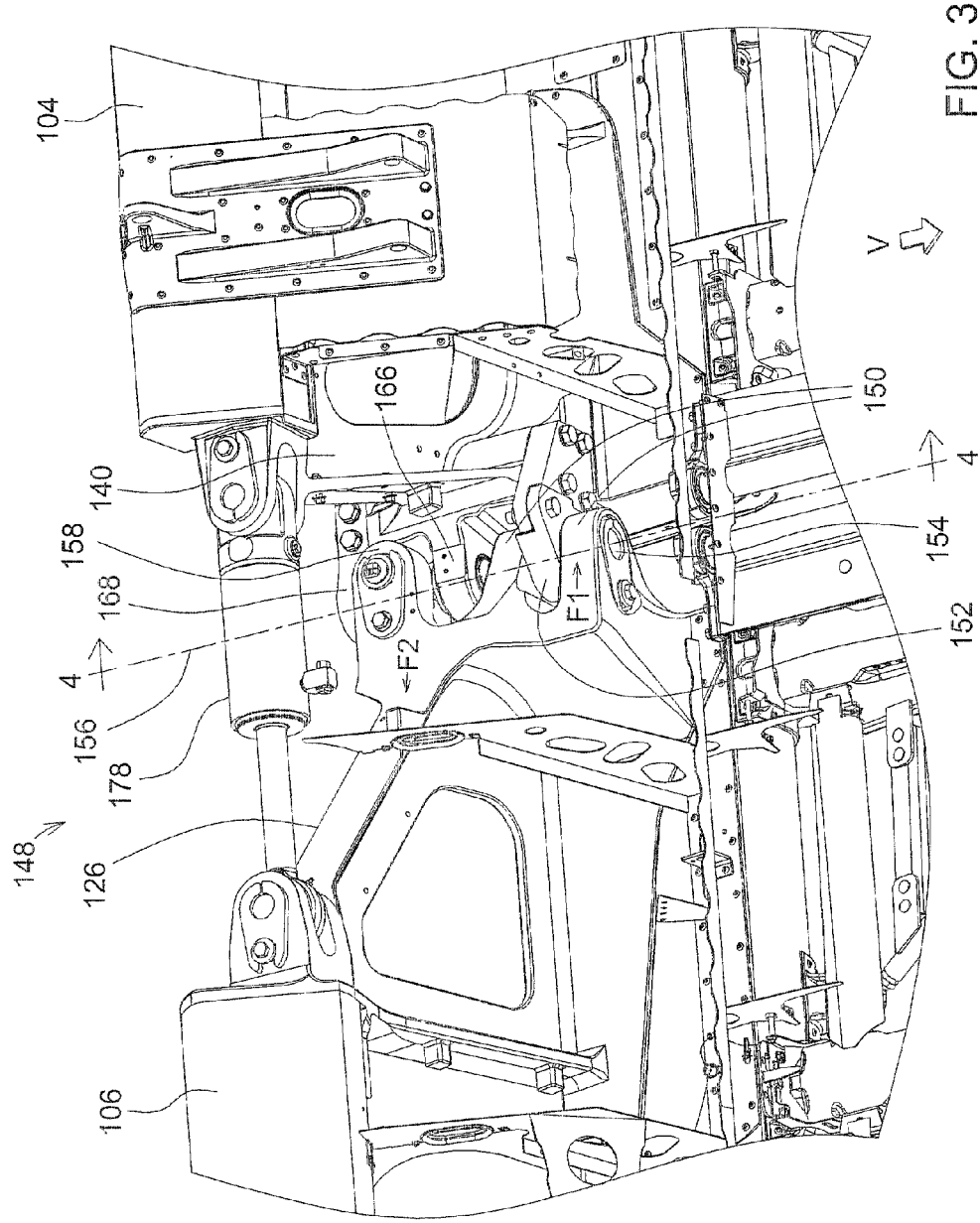
FIG. 3 is a close-up perspective view of the right side hinge joint between the center section of the agricultural harvesting head of FIGS. 1-2 and the right wing section of the agricultural harvesting head of FIGS. 1-2.

The term "side-to-side", "sideways", "laterally" or "lateral" refer to a direction that is horizontal and generally parallel to the longitudinal extent of the agricultural harvesting head itself. This direction is perpendicular to a direction of travel "V" of the machine as it travels through the field harvesting crops. The terms "in front of", "front", "forward", "fore" and the like refer to the direction of travel "V". The terms "back", "rear", "behind", "to the rear of" and the like refer to a direction opposite to the direction of travel "V". The terms "inward" or "inwardly" refer to a direction generally parallel to the longitudinal extent of the agricultural harvesting head, and toward the lateral midpoint of the agricultural harvesting head. The terms "outward" or "outwardly" refer to a direction generally parallel to the longitudinal extent of the agricultural harvesting head, and away from the lateral midpoint of the agricultural harvesting head.

The agricultural harvesting head described herein is mirrored about a vertical and fore and aft extending plane passing through the lateral midpoint of the agricultural harvesting head 100. As a result, the description below regarding the construction and arrangement of the right side of the agricultural harvesting head 100 are equally applicable to the left side of the agricultural harvesting head 100 but in mirror image form.

In FIG. 1, an agricultural harvesting head 100 includes a left section 102, a center section 104, and a right section 106. A left side conveyor 108 of the endless belt type is supported on the left side of the agricultural harvesting head 100. The left side conveyor 108 conveys crops to the right and toward the lateral midpoint of the agricultural harvesting head 100.

A right side conveyor 110 of the endless belt type is supported on the right side of the agricultural harvesting head 100. The right side conveyor 110 conveys crops to the left and toward the lateral midpoint of the agricultural harvesting head 100.

A center conveyor 112 of the endless belt type is supported on the center section of the agricultural harvesting head 100 and is disposed to receive cut crop material and carry it rearward through an aperture 114 in the rear wall of the agricultural harvesting head 100.

An elongate reciprocating knife 116 extends laterally across the leading edge of the agricultural harvesting head 100 over substantially the entire width of the agricultural harvesting head 100. It is operable to sever crop plants near their roots. These crop plants are directed by a conventional harvesting head reel (not shown) rearward on to the left side conveyor 108, the right side conveyor 110, and the center conveyor 112.

Referring to FIG. 2, the right section 106 comprises a right frame 118 that comprises an upper frame member 120 that extends laterally across the entire width of the right section 106, a lower frame member 122 that extends laterally across the entire width of the right section 106, a plurality of vertical struts 124 that couple the upper frame member 120 to the lower frame member 122, and a casting 126 that is fixed to the inner ends of both the upper frame member 120 and the lower frame member 122. The lower frame member 122 has a plurality of spaced apart forwardly extending arms 128 that support rollers 130 and also support the reciprocating knife 116. The support rollers 130 support the endless belts on the right section 106 that are shown in FIG. 1.

The center section 104 comprises a center frame 132 that comprises an upper frame member 134 that extends laterally across the entire width of the center section 104, a lower frame member 136 that extends laterally across the entire width of the center section 104, a casting 138 disposed at the left end of the center section 104 that is fixed to the outer left ends of both the upper frame member 134 and the lower frame member 136, a casting 140 disposed at the right end of the center section 104 that is fixed to the outer right ends of both the upper frame member 134 and the lower frame member 136, a plurality of vertical struts 142 that couple the upper frame member 134 and the lower frame member 136, and a plurality of spaced apart forwardly extending arms 144 that support rollers 146 and also support the reciprocating knife 116. The support rollers 146 support the endless belts on the center section 104 that are shown in FIG. 1. The center section 104 is identical in each end with all components mirrored about a central vertical and fore-and-aft extending plane.

In FIG. 3, the right side hinge joint 148 is shown. The right side hinge joint 148 comprises a front pivot joint and a rear pivot joint. The front pivot joint comprises two inwardly extending flanges 150 of casting 126 that define a gap therebetween. That gap receives an outwardly extending flange 152 of casting 140. A first pivot pin 154 is received into and is supported in apertures in the two inwardly extending flanges 150 and the outwardly extending flange 152. This arrangement permits the casting 126 (and therefore the right section 106) to pivot upward and downward about the casting 140 (and therefore the center section 104) about a fore-and-aft extending axis 156. The centerline of the first pivot pin 154 is co-linear with the fore and aft extending axis 156.

The right side hinge joint 148 also comprises a rear pivot joint that in turn comprises an upper and inwardly extending flange 158, and a lower and inwardly extending flange 160 that define a gap therebetween. These two flanges are joined together by a second pivot pin 162 which is supported in apertures in both the upper and inwardly extending flange 158 and the lower inwardly extending flange 160. The second pivot pin 162 extends vertically and has a central axis 164 that intersects the fore and aft extending axis 156.

The rear pivot joint further comprises a forward and outwardly extending flange 166 and a rearward outwardly extending flange 168. Flange 166 and flange 168 define a space therebetween through which the second pivot pin 162 extends. A third pivot pin 170 extends into and is supported in apertures in the outwardly extending flanges 166 and the 168.

The third pivot pin 170 surrounds and supports a central region of the second pivot pin 162. The third pivot pin 170 defines a cylindrical hole 172 formed in a central region of the third pivot pin 170. The hole 172 passes completely through the third pivot pin 170 and supports a central region of the second pivot pin 162. The central axis 164 intersects a longitudinal axis 176 of the third pivot pin 170. The second pivot axis 164 and the longitudinal axis 176 intersect each other at a right angle. The longitudinal axis 176 and the longitudinal axis 156 are coaxial. The right section 106 pivots with respect to the center section 104 about the longitudinal axis 176 and the longitudinal axis 156.

The rear pivot joint is a Cardan or "universal" joint. The second pivot pin 162 and the third pivot pin 170 form the cross trunnion of the universal joint. The upper and lower ends of the second pivot pin 162 form the upper and lower ends, respectively, of the cross trunnion. They are diametrically opposite trunnions of the cross trunnion that are oriented generally vertically. The front and rear ends of the third pivot pin 170 form front and rear ends, respectively, of the cross trunnion. They are diametrically opposite opposed trunnions of the cross trunnion that are oriented generally horizontally.

This universal joint arrangement is advantageous particularly in case of injury to the agricultural harvesting head 100. If the ground force acting on the right section 106 becomes too great, the first pivot pin 154 can break. By configuring the rear pivot joint as a universal joint, the right section 106 can pivot both rearward and upward away from the ground about the rear pivot joint if the first pivot pin 154 breaks. Further, if the first pivot pin 154 breaks, either the operator or an automatic system can responsively retract the hydraulic cylinder 178 thereby actively lifting the right section 106 away from the ground and away from the obstruction that caused the first pivot pin 154 to break. Again, this simultaneous upward and rearward movement of the right section 106 is provided because the rear pivot joint is configured as a universal joint.

A hydraulic cylinder 178 is coupled to and between the center section 104 and the right section 106. The rod end of the hydraulic cylinder 178 is coupled to an upper portion of the casting 126 at a point disposed above the axis 156. The cylinder end of the hydraulic cylinder 178 is coupled to an upper portion of the casting 140.

When the hydraulic cylinder 178 decreases in length, it pulls the upper portion of the right section 106 and the upper portion of the center section 104 together. This permits the right section 106 to pivot upward with respect to the center section 104 about axis 156 and axis 176. When the hydraulic cylinder 178 increases in length, it permits the upper portion of the right section 106 and the upper portion of the center section 104 to move apart. This permits the right section 106 to pivot downward with respect to the center section 104 about axis 156 and axis 176.

The second pivot pin 162 is a load pin. It is configured to sense loads applied to the second pivot pin 162, to generate a corresponding load signal, and to communicate that load signal to an external device through a sensor lead 180. As the right section 106 pivots up and down with respect to the center section 104, the second pivot pin 162 pivots together with the right section 106. Thus, no matter what the pivoted position of the right section 106, the second pivot pin 162 maintains the same spatial alignment and orientation with the right section 106, and therefore provides a more consistent load signal regardless of the pivotal position of the right section 106.

The first pivot pin 154, the second pivot pin 162, and the third pivot pin 170 define longitudinal axes that lie in the same plane. The first pivot pin 154 and the third pivot pin 170 have longitudinal axes that are coaxial. The second pivot pin 162 and the third pivot pin 170 have longitudinal axes that intersect at the middle of the cross trunnion.

As the agricultural harvesting head 100 travels through the field in a direction of travel "V" (see FIGS. 1-2), the right section 106 contacts the ground. If this ground contact is small, the right section 106 will skim over the ground and the ground will apply only a small rearward force "GF" (see FIGS. 1-2) to the right section 106. If this ground contact is high, however, the right section will tend to embed itself in the ground and the ground will apply a very large rearward force "GF" (see FIGS. 1-2) to the right section 106. The rearward force "GF" generates a torque about the right side hinge joint 148 that is resisted by an opposing torque applied at the right side hinge joint 148 by a force "F1" applied by the first pivot pin 154 (see FIG. 3) and a force "F2" applied by the second pivot pin 162 (see FIG. 3). The first pivot pin 154 and the second pivot pin 162 are closely spaced. As a result, for any ground force "GF", the forces "F1" and "F2" will be substantially larger than "GF". If the ground force "GF" is too great, damage to the agricultural harvesting head 100 may occur. The second pivot pin 162 provides a load signal that indicates the magnitude of the ground force "GF" and can be used to control the operation of the combine harvester.

It should be understood that the particular arrangements shown and discussed herein are not the only ways in which the invention can be created. The arrangements shown herein are the currently preferred embodiments of the invention. However, one skilled in the art of agricultural harvester and agricultural harvesting head design and manufacture can readily see other variations that would also fall within the scope of the claims below.

For example, the rear pivot joint need not be configured as a universal joint. Instead, the rear pivot joint can be configured the same as the front pivot joint with a single pivot pin extending fore and aft in place of the third pivot pin 170 and coaxial with the first pivot pin 154. In this arrangement, the single pivot pin would be a load pin.

As another example, the first pivot pin 154 can be a load pin instead of the second pivot pin 162.

As another example, the cross trunnion formed of the second pivot pin and the third pivot pin can be rotated 90° about a laterally extending axis such that the second pivot pin 162 takes the illustrated position of the third pivot pin 170 and the third pivot pin 170 takes the illustrated position of the second pivot pin 162.

We claim:

1. An articulated harvesting head load sensor arrangement comprising:
   a first harvesting head section (102, 104, 106);
   a second harvesting head section (102, 104, 106) hingeably coupled to the first harvesting head section (102, 104, 106); and
   a first pivot pin (162) hingeably coupling the first harvesting head section (102, 104, 106) to the second harvesting head section (102, 104, 106);
   wherein the first pivot pin (162) defines two diametrically opposite trunnions of a cross trunnion and is a load pin configured to generate a signal indicative of a load applied to the first pivot pin (162).

2. The articulated harvesting head load sensor arrangement of claim 1, wherein the first pivot pin (162) is cylindrical and defines a longitudinal axis.

3. The articulated harvesting head load sensor arrangement of claim 1, wherein the first pivot pin (162) is received inside a second pivot pin, the second pivot pin having a central aperture, two opposing ends that define two diametrically opposed trunnions of the cross trunnion.

4. The articulated harvesting head load sensor arrangement of claim 1, wherein the first pivot pin (162) pivots together with the first harvesting head section (102, 106) with respect to the second harvesting head section (104).

5. An articulated harvesting head load sensor arrangement comprising:
   a first harvesting head section (102, 104, 106);
   a second harvesting head section (102, 104, 106) hingeably coupled to the first harvesting head section (102, 104, 106); and
   a first pivot pin (162) hingeably coupling the first harvesting head section (102, 104, 106) to the second harvesting head section (102, 104, 106);
   wherein the first pivot pin (162) is a load pin configured to generate a signal indicative of a load applied to the first pivot pin (162) and wherein the longitudinal axis of the first pivot pin (162) is disposed generally vertically.

6. The articulated harvesting head load sensor arrangement of claim 5, further comprising a second pivot pin (154) having a longitudinal axis disposed at a right angle to the longitudinal axis of the first pivot pin (162), and further wherein the second pivot pin is disposed to hingeably coupled the first harvesting head section (102, 104, 106) to the second harvesting head section (102, 104, 106).

7. The articulated harvesting head load sensor arrangement of claim 6, wherein a central axis of the second pivot pin is disposed in the same plane as the central axis of the first pivot pin.

8. The articulated harvesting head load sensor arrangement of claim 6, wherein the first pivot pin (162) defines two diametrically opposed trunnions of a cross trunnion.

9. An articulated harvesting head load sensor arrangement comprising:
   a first harvesting head section (106);
   a second harvesting head section (104);
   a third harvesting head section (102);
   a first pivot pin (162) hingeably coupling the first harvesting head section (106) to the second harvesting head section (104); and a second pivot pin (162) hingeably coupling the third harvesting head section (102) to the second harvesting head section (104);

wherein the first pivot pin (162) is a load pin configured to provide an electrical signal indicative of a load applied to the first pivot pin (162), and the second pivot pin (162) is a load pin configured to provide an electrical signal indicative of a load applied to the second pivot pin (162).

10. The articulated harvesting head load sensor arrangement of claim 9, wherein the first pivot pin (162) is configured to generate a first load signal indicative of a ground force applied to the first harvesting head section (106), and further wherein the second pivot pin (162) is configured to generate a second load signal indicative of a ground force applied to the third harvesting head section (102).

11. The articulated harvesting head load sensor arrangement of claim 9, wherein the first pivot pin (162) and the second pivot pin (162) are disposed at opposite ends of the second harvesting head section (104).

12. The articulated harvesting head load sensor arrangement of claim 9, wherein the first pivot pin (162) forms two trunnions of a first cross trunnion of a first universal joint, and wherein the second pivot pin (162) forms two trunnions of a second cross trunnion of a second universal joint.

13. An articulated harvesting head load sensor arrangement comprising:

a first harvesting head section (102, 104, 106);

a second harvesting head section (102, 104, 106) hingeably coupled to the first harvesting head section (102, 104, 106); and a first pivot pin (162) hingeably coupling the first harvesting head section (102, 104, 106) to the second harvesting head section (102, 104, 106);

wherein the first pivot pin (162) is a load pin configured to generate an electrical signal indicative of a load applied to the first pivot pin (162).

\* \* \* \* \*